(No Model.)  
2 Sheets—Sheet 2.

A. J. BRILL.
SHAFT SUPPORT.

No. 296,387.  
Patented Apr. 8, 1884.

ATTEST  
Ed. R. Hill,  
Walter Chamberlin

INVENTOR  
Andrew J. Brill  
per Wm. Hubbell Fisher  
Atty

UNITED STATES PATENT OFFICE.

ANDREW J. BRILL, OF CINCINNATI, OHIO.

SHAFT-SUPPORT.

SPECIFICATION forming part of Letters Patent No. 296,387, dated April 8, 1884.

Application filed August 16, 1883. (No model.)

*To all whom it may concern:*

Be it known that I, ANDREW J. BRILL, a resident of the city of Cincinnati, in the county of Hamilton and State of Ohio, have invented certain new and useful Improvements in Shaft Supports and Bearings, of which the following is a specification.

While my invention is more particularly intended to be used in connection with sewing-machines, certain features of it are (as will be hereinafter mentioned) applicable to the shafts of other machinery.

The various features of my invention and the several advantages resulting from the use of the same, conjointly or otherwise, will be apparent from the following specification.

Figure 1:
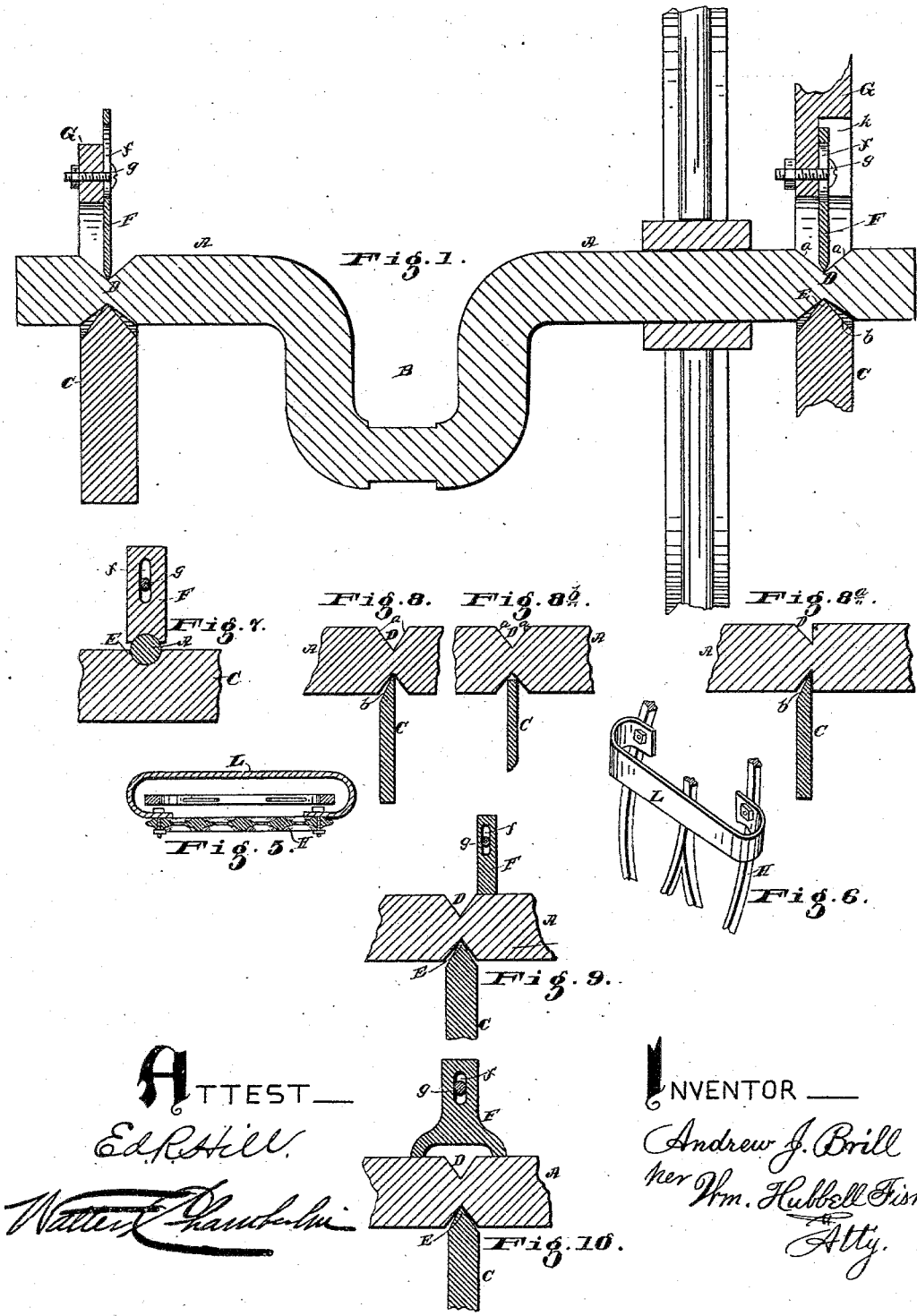
Figure 2:
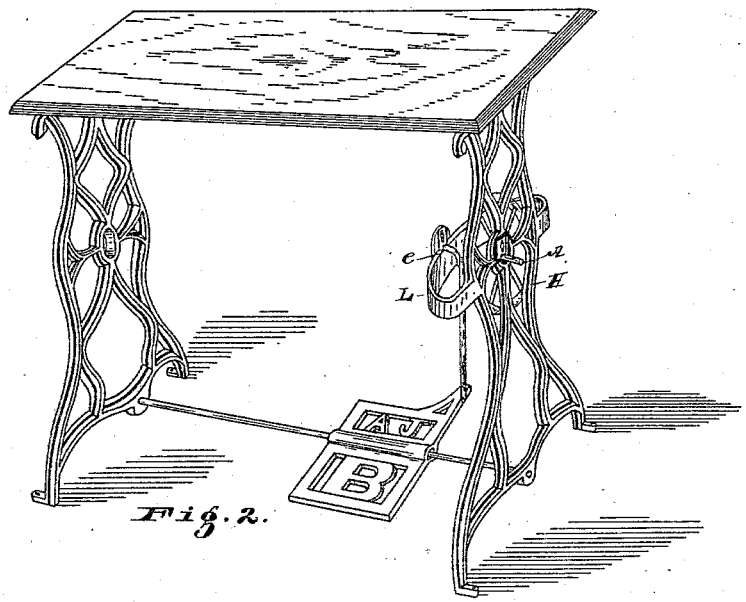
Figure 3:
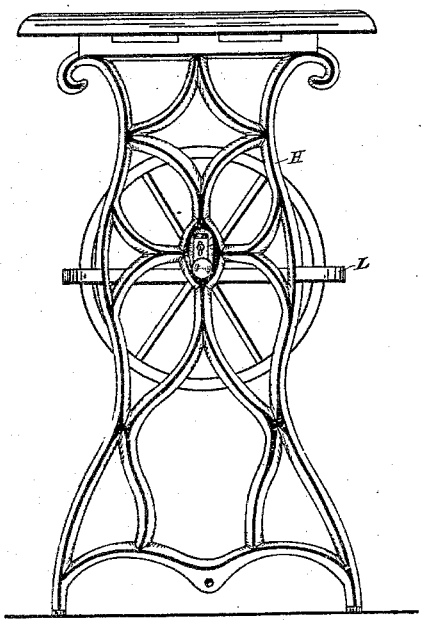
Figure 4:
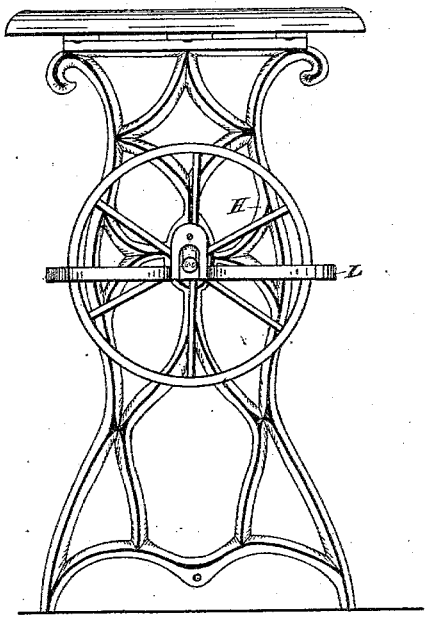

In the accompanying drawings, Figure 1 represents a vertical central longitudinal section of the shaft and bearings embodying certain features of my invention. Fig. 2 illustrates the preferred form of application of my invention to a sewing-machine stand. Fig. 3 represents an elevation of that end of the same stand which is on the right hand in Fig. 2. Fig. 4 represents an elevation of the inside of the leg shown in Fig. 3, and of the mechanism it supports, excepting the treadle, treadle-shaft, and crank-shaft, which have been removed. Fig. 5 is a top view of a horizontal section of the supporting-yoke and the leg to which it is attached, shown in Fig. 2, the yoke being bolted to the leg. Fig. 6 is a view in perspective of the same yoke and a portion of a leg to which it is bolted. Fig. 7 is a vertical section taken transversely through the shaft and through the center of the lower bearing and the preferred form of upper bearing. Figs. 8, 8$^a$, 8$^b$ are vertical sections of shaft and bearings, taken through the center of the shaft and transversely through the bearings, and showing certain combinations of certain features of my invention. Fig. 9 is a vertical central section of one of the bearings embodying one of the features of my invention in connection with one of the various forms of opposing journal-bearing which may be advantageously employed. Fig. 10 represents a vertical central section of one form of upper bearing which may be used in connection with certain features of my invention.

A indicates a shaft or axle, which is to turn partially or altogether around. This shaft may, when desired, be provided with a crank. In the illustration the shaft is shown provided with a double crank, B. This shaft is supported by and turns upon bearings C C. The shaft is provided with an annular groove, D, one side at least of which is inclined, and the groove diminishes in breadth as you approach the bottom. The breadth of the bottom of the groove is preferably, as shown, a line or continuous point practically of no appreciable thickness. Preferably both sides $a$ of the groove are inclined. The bearings upon which the shaft rests and upon which it oscillates are, at the point when they meet the shaft, thin in cross-section and substantially sharp. The end or edge E of the bearing is curved or concaved suitably to fit the round or convexity of the shaft at the bottom of the groove, as shown in Fig. 7. One of the sides $b$ of the bearing C is inclined, and preferably both sides are inclined. Obviously, therefore, the combination of bearing and shaft may be that shown in Fig. 8$^a$, where one side of the groove D of the shaft is inclined and one side of the bearing is inclined, or that shown in Fig. 8, where both sides of the groove are inclined and one side only of the bearing is inclined, or that shown in Fig. 8$^b$, where the bearing has a blunt edge working in the groove of the shaft. The preferred form of bearing and groove in shaft is that shown in Fig. 1. This combination of groove having a beveled side or sides, as described, and a bearing, substantially as set forth, enables the shaft to be oscillated or rotated with the least possible friction, and such bearing is very durable. As the bottom of the groove wears and the edge of the bearing wears, the bearing and the groove mutually adjust themselves to each other, and where there are two sets of bearings and grooves—one set at one end or portion of the shaft and another at another end or portion of the shaft—these bearings and grooves will wear true, and the shaft will always be well prevented from longitudinal play. Thus all thrusts lengthwise of the shaft will be obviated. For this reason this bearing and groove are of great advantage in connection with shafts which need to run true, and which are to carry wheels, cranks, &c., requiring precision of rotation without deviation from one plane at right angles to the axis of the shaft. For this reason my improved grooves and bearings are of great value in connection with sewing-machines where the shaft is to carry the crank and the band-wheel.

Any suitable device may, when necessary, be employed to keep the shaft from rising off from or out of the bearing. For example: among the various devices of this kind which may be successfully employed is a bearing having a bearing-surface flat in the direction of the length of the shaft, as shown in Fig. 9, or branched, so as to span the groove and press on the upper portion of said axle on each side of the groove, as shown in Fig. 10. A preferred form of such device is that shown in Fig. 1, and consists of a bearing-piece, F, whose edge in cross-section is made pointed or sharp, preferably by beveling both sides of the edge. This sharp edge fits down into the bottom of the groove, and is preferably rounded or curved in the direction of its length, as shown in Fig. 7, to fit or embrace a portion of the periphery of the bottom of the groove. Such a bearing, F, likewise prevents longitudinal play of the shaft, diminishes friction, and assists in enabling the oscillation or rotation of the shaft to be noiseless.

It may be here remarked that the beveled side or sides of bearing C and the beveled side or sides of the upper bearing, F, are preferably inclined at a more acute angle with reference to each other or to the straight side where only one side is beveled than the beveled side or sides of the groove are to each other or to the straight side where only one side is beveled.

The object of making the sides of the edge of the bearings form a more acute or less obtuse angle with each other in cross-section, as is substantially shown in Fig. 1, than is the angle made by the sides of the groove, is to enable the continuous point or edge of the bearing to fit into and come in contact with the bottom of the groove thereby making the bottom of the groove and the edge of the bearings substantially the only points or places where the bearings and shaft touch each other. Thus all friction between the side of the bearing and of the groove it enters is obviated. When the upper bearings are present, a very convenient mode of adjusting them is that which will now be described, viz: The upper bearing is provided with a vertical slot, $f$, and a screw or bolt, $g$, passes through the slot $f$, and is secured to a suitable bearing-support, G, the head of the screw, or the head or nut of the bolt when the latter is used, engaging the outer side or sides of the bearing-piece F in the portion adjacent to the slot. As the edge of the bearing F wears away, the bearing can be set closer to or in contact with the shaft by loosening the bolt or screw and setting the bearing and then tightening said bolt or screw. When the bearing is in a position above the shaft and the slot $f$ is vertical or approximately so, upon loosening the set-screw or bolt $g$ the bearing will descend till it rests lightly upon the shaft. In such event this bearing needs no adjustment further than loosening the set screw or bolt and then retightening it. Where the bearing-piece F is of the form shown in Fig. 1, the adjustment of the bearing will bring its bearing-edge near to or in contact with the bottom of the groove, as desired. When it is desired for any reason to increase the width of the support G and retain a bearing, F, acting upon the shaft directly or approximately above the lower bearing, C, and it is desired to keep the bearing out of the way and arrange the same so that the head of the screw or the head or the nut of the bolt shall not project beyond the plane of the outer surface of the support G, I make provision for carrying out said desire preferably by making a recess, $k$, in the support G and setting the bearing within said recess. Such an arrangement is illustrated in connection with the support G at the right-hand side in Fig. 1. This last-named arrangement is of particular advantage when my improved bearing is applied to the crank-shaft of a sewing-machine stand. The recess is then preferably formed (see Figs. 1, 2, and 3) in the leg H of the stand. The bearing C beneath said recessed leg H likewise is preferably formed by a part of the said leg. The other bearing is supported by or preferably formed with a suitable support, and the bearing is such a one as is shown in Fig. 1, and indicated by the letter $e$. The preferred form of such support consists of a yoke, L. This yoke may be cast in one piece with or made separate from the leg H, and then suitably secured thereto. In Figs. 2, 3, and 4 the yoke is shown formed in one piece with the leg H. In Figs. 5 and 6 it is shown bolted to the leg. This yoke is suitable for supporting any suitable bearing at that end of the shaft which is opposite to the end which is supported at the leg by a suitable bearing.

The shaft of the sewing-machine is provided with a crank, preferably a double one, as shown, and also carries a fly-wheel, which may be the band-wheel. This fly-wheel is preferably cast in one piece with the shaft. It may be remarked that an upper bearing often becomes necessary—for instance, where the shaft is liable to be lifted or disturbed in its lower bearing. Thus where the shaft carries a crank operated by a vertical pitman located below the crank, or carries a fly-wheel belted to a pulley above, the impulse communicated to the crank while during the lower half of its circle of rotation and the lifting influence of a tight pulley-band acting on the fly-wheel would operate to lift the shaft out of its lower bearings were the upper bearings not present. Where the sharp edge bearing, whose length is in a direction transverse to the length of the shaft, and a shaft-groove, substantially as described, are so employed in certain treadle and other movements as that the shaft does not entirely rotate, but rotates for only a portion of its periphery, and then returns in a contrary direction for the same distance, the groove in the shaft obviously need not go entirely around the said shaft. Obviously only one of such grooves and bearings may be used, when desired, the shaft receiving support at another point by means of a different kind of bearing. When the knife-edge bearings are used in connection with a machine-stand, one of the knife-edge bearings is preferably cast in one piece with the leg of the stand, and where a yoke or half-yoke is employed one of the knife-edge supporting-bearings is preferably cast in one piece with the said yoke or half-yoke; and in the claims I shall employ the term "half-yoke" as the equivalent of the term "whole yoke," so far as regards casting the knife-edge bearing therein.

The various features of my invention are preferably used together; but one or more of them may be employed without the remainder.

One or more of said features may be employed, so far as applicable, in connection with devices and things other than those particularly herein set forth.

What I claim as new and of my invention, and desire to secure by Letters Patent, is—

1. The shaft having a groove at right angles to its length and diminishing in cross-section as it approaches the center of the shaft, and the lower bearing-piece having a sharp edge engaging the bottom of the groove, the edge being curved in the direction of its length to fit the convexity of the shaft, substantially as and for the purposes specified.

2. A shaft having an annular groove in cross-section diminishing in size toward the center of the shaft, in combination with the lower bearing, the sides of the upper edge of which are beveled to form a knife-edge, the bottom of the annular groove resting on said knife-edge, and the sides of said groove being free from the beveled upper edge of said lower bearing, substantially as and for the purposes specified.

3. A shaft having an annular groove in cross-section diminishing in size toward the center of the shaft, in combination with the lower bearing, the sides of the upper edge of which are beveled to form a knife-edge, the bottom of the annular groove resting on said knife-edge, and being curved in the direction of its length to fit the convexity of the shaft, the sides of the groove being free from the beveled upper edge of said lower bearing, substantially as and for the purposes specified.

4. In combination, the shaft having annular groove in cross-section diminishing in size as it approaches the center of the shaft, and a lower bearing-piece having a substantially sharp edge engaging the bottom of said groove, the sides of the groove being free from the beveled sides of said bearing, substantially as and for the purposes specified.

5. In combination, the shaft having annular groove in cross-section diminishing in size as it approaches the center of the shaft, and a bearing-piece having a sharp edge engaging with the bottom only of said groove at one side of the shaft, and an upper bearing-piece having a sharp edge engaging the bottom only of said groove at the opposite side of said shaft, substantially as and for the purposes specified.

6. In combination, the shaft having annular groove provided with beveled sides, and a lower bearing-piece having beveled sides terminating in a sharp edge engaging said groove, and the upper bearing-piece having beveled sides terminating in a sharp edge engaging said groove, substantially as and for the purposes specified.

7. The shaft having annular groove and meeting beveled sides, in combination with two opposite bearing-pieces located at substantially opposite sides of its periphery, and each having a sharp edge engaging the bottom of said groove, and curved in the direction of its length to fit the periphery of the shaft at the bottom of the groove, substantially as and for the purposes specified.

8. The mechanism of annular beveled edge bearings and a knife-edge support, in combination with a knife-edge upper support, substantially as and for the purposes specified.

9. In combination, the shaft having annular groove provided with beveled sides and narrow bottom, and lower bearing-piece provided with sharp edge engaging the bottom of said groove, and the upper bearing-piece provided with slot and setting-screw device, substantially as and for the purposes specified.

10. In combination with the shaft having annular groove, substantially as herein described, the knife-edge lower bearing, and the upper bearing having a knife-edge and slot and set screw or bolt, substantially as and for the purposes specified.

11. In combination, a machine-stand having the yoke cast to the leg, the yoke carrying a knife-edge bearing, and the leg carrying a knife-edge bearing, and the shaft, crank, and slotted bearing-pieces, substantially as and for the purposes specified.

12. In combination, a machine-stand having the yoke cast to the leg, the yoke carrying a knife-edge bearing, and the leg carrying a knife-edge bearing, and the shaft, crank, and slotted bearing-pieces, substantially as and for the purposes specified.

13. In combination, a machine-stand having the yoke cast to the leg, the yoke carrying a knife-edge bearing, and the leg carrying a knife-edge bearing, and the treadle-shaft crank and slotted bearing-pieces, the leg being provided with recess for reception of a bearing-piece, substantially as and for the purposes specified.

14. In a sewing-machine stand, a half-yoke for supporting a bearing of the treadle-shaft, said half being screwed to the leg at each side of the stand, substantially as and for the purposes specified.

15. In combination with the leg of a machine-stand, the knife-edged bearing located in the leg and adapted to engage a groove in the shaft, substantially as and for the purposes specified.

16. In combination with the leg of a machine-stand, the knife-edged bearing located in and cast to the leg and adapted to engage a groove in the shaft, substantially as and for the purposes specified.

17. The half-yoke provided with a knife-edge bearing cast to the yoke, substantially as and for the purposes specified.

18. In a sewing-machine, the combination of the stand, fly-wheel, crank, adjustable knife-edge bearings C F, and shaft provided with annular grooves, substantially as and for the purposes specified.

A. J. BRILL.

Attest:
  S. B. DEAL,
  O. M. HILL.